June 22, 1926.　　　　　　　　　　　　　　　1,589,864
O. A. SCHNEIDER
DEVICE FOR THE STARTING OF INTERNAL COMBUSTION ENGINES IN COLD AIR
Filed August 11, 1924

Patented June 22, 1926.

1,589,864

UNITED STATES PATENT OFFICE.

OSKAR ALBAN SCHNEIDER, OF THUM, GERMANY.

DEVICE FOR THE STARTING OF INTERNAL-COMBUSTION ENGINES IN COLD AIR.

Application filed August 11, 1924, Serial No. 731,472, and in Germany November 3, 1923.

A serious inconvenience connected with internal combustion engines is that the starting of the same is impossible when the air is cold. The reason is that cold air can not be saturated with benzine.

According to this invention this inconvenience is avoided in supplying continuously heated air or a warm mixture of benzine gas to the carburettor, the hot air or the warm benzine mixture being supplied to the carburettor until this carburettor and its surroundings together with the motor are sufficiently heated. The device shown by way of example on the accompanying drawing is designed for carrying out this problem.

Figure 1:
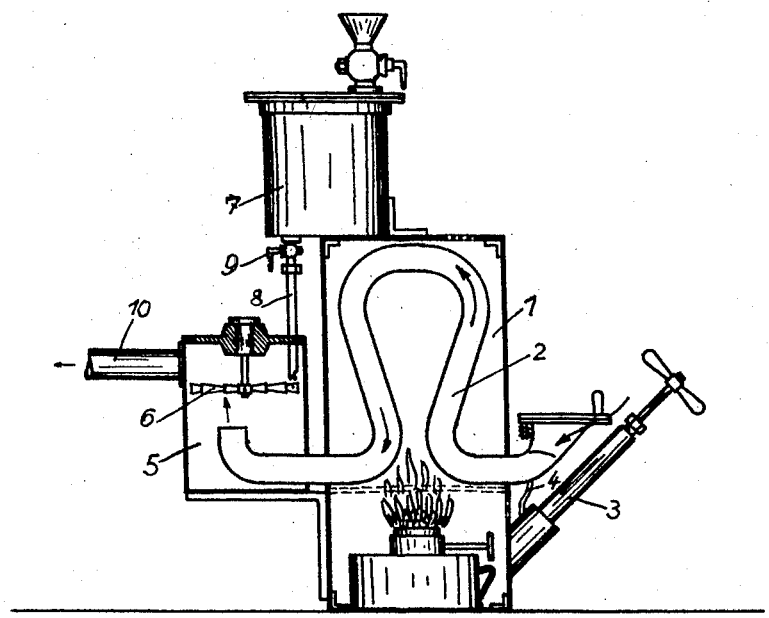
Figure 2:
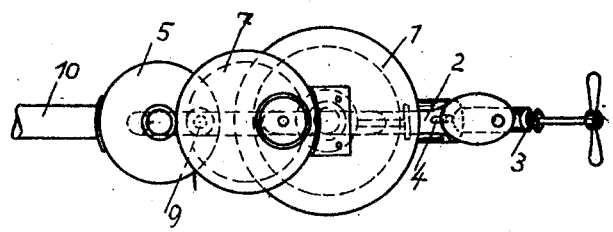

Fig. 1 shows the device in vertical section.
Fig. 2 is a plan view of the same.

The device consists of a vessel 1 adapted to be heated and comprising a tube 2 closed at the outer end by an adjustable cover. The cold outer air flows in at this outer end of tube 2. An air pump 3 arranged on the lower part of vessel 1 communicates by a tube 4 with the air tube 2. Any other suitable pressure means might be substituted for the air pump. The inner end of tube 2 projects through the wall of vessel 1 and into a second vessel 5 in which a propeller 6 is mounted so that it can easily revolve. Above the propeller 6 a benzine reservoir 7 is mounted on the top plate of vessel 1, the benzine for the reservoir being admitted onto the propeller 6 by means of a tube 8. A multiple way cock 9 serves to accurately regulate the admission of benzine. The apparatus is connected with the carburettor of the engine by means of a tube 10 branching off at the top end of vessel 5.

The operation is as follows:—

Before the motor is started the apparatus is heated, for instance by means of a spirit lamp, electrically or in any other convenient manner. When sufficient heat has been generated the hot air is forced, with the aid of pump 3, into the vessel 5 whereupon one of two ways of proceeding can be selected. Either hot air alone is used in which case no benzine is supplied onto the propeller 6 the hot air flowing to the carburettor where it admixes easily with the benzine admitted to the carburettor, an explosive mixture being thus produced; or a mixture of hot air and benzine is supplied to the carburettor from the apparatus in which case the multiple way cock 9 is opened so that benzine flows from the reservoir 7 onto the propeller.

The propeller which is rotated by the current of hot air atomizes the benzine so that the air is thoroughly saturated with benzine, the mixture being forced with the aid of the pump 3 into the carburettor. The motor starts at once and continues to work as hot explosive mixture is flowing in continuously. As soon as the motor has been started it sucks the hot air in through the tube 10 so that it is no longer necessary to operate the pump 3. The device is used until the motor and the carburettor generate a sufficient quantity of individual heat.

When only hot air has to be used the device is simplified by the omission of the propeller, its vessel and the benzine reservoir.

The propeller might be arranged in vessel 1 in which case however the heating space must be separated from the upper part of vessel 1 by a horizontal partition to avoid the danger of explosion in vessel 1. When the apparatus is electrically heated there will be no danger of explosion.

The form of construction shown on the drawing is given by way of example only as it may be modified according to requirement. Instead of benzine any other fuel may be used.

I claim:—

A device for the starting of internal combustion engines in cold air with the aid of compressed air designed to force the starting mixture to the engine, comprising in combination a heatable vessel arranged outside the engine, an air tube in said vessel in which the air is heated, and means for conducting said heated air to the carburettor of the engine, a propeller over the outlet end of said air tube, a benzine reservoir above said propeller and means for supplying benzine from said reservoir onto said propeller so that the hot air from the air tube is saturated with benzine and a mixture of benzine gas and air is supplied to the carburettor of the engine.

In testimony whereof I affix my signature.

OSKAR ALBAN SCHNEIDER.